United States Patent Office 2,754,083
Patented July 10, 1956

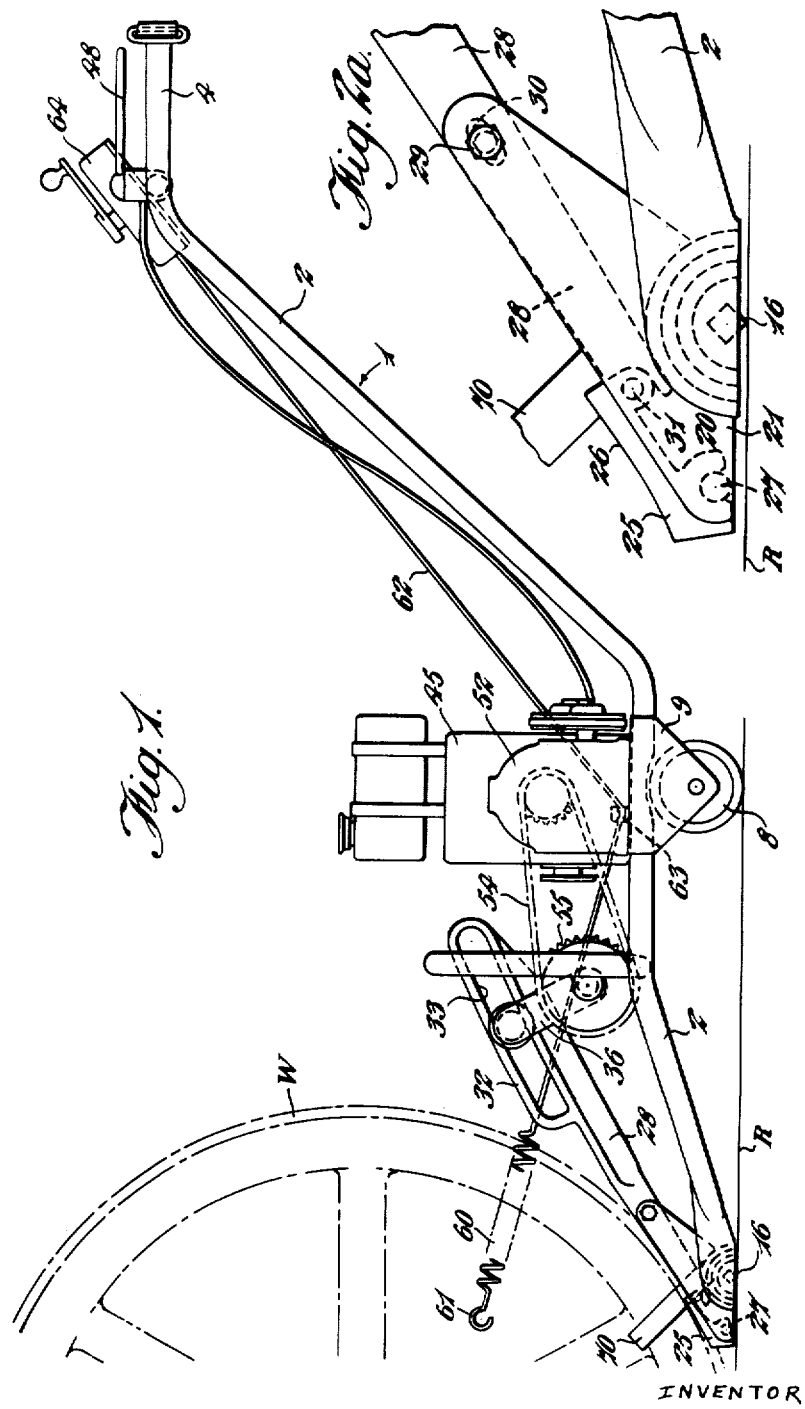

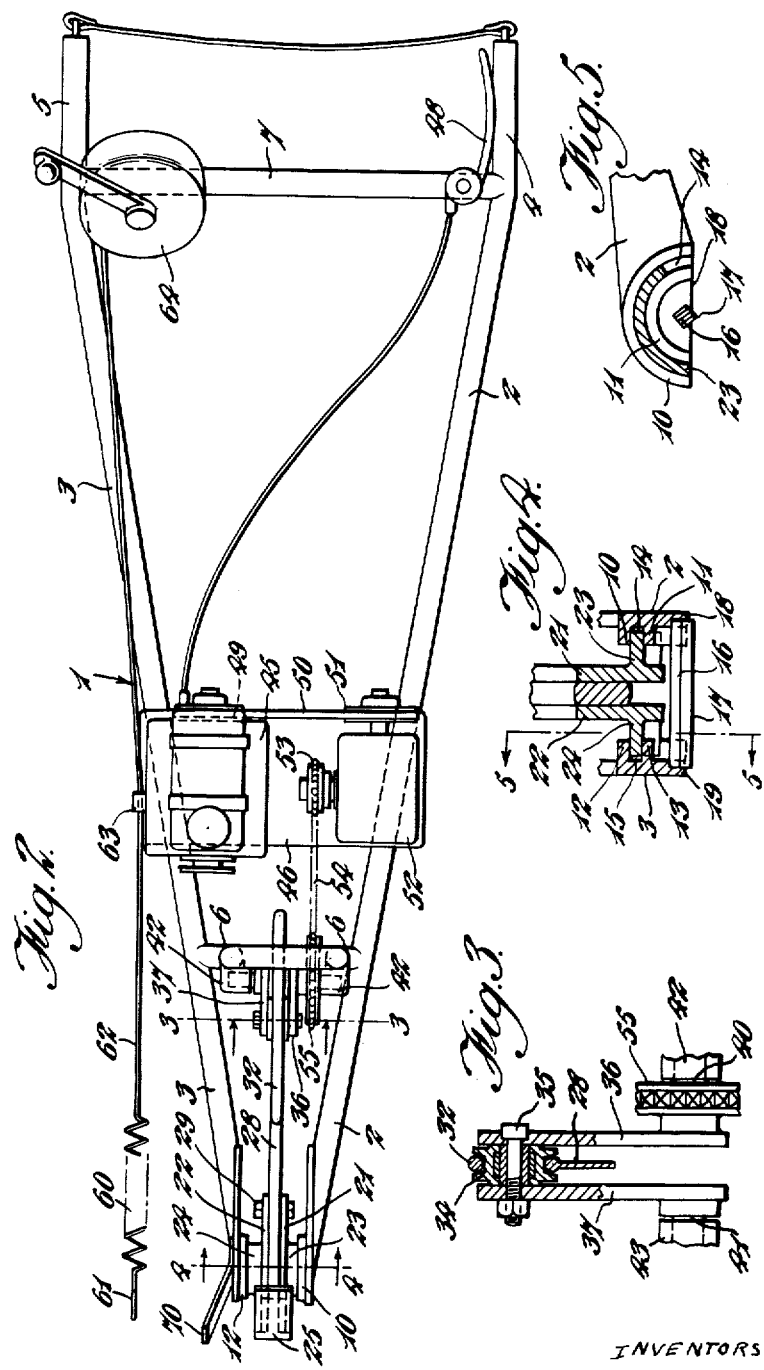

2,754,083
APPARATUS FOR MOVING WHEELED VEHICLES ALONG SURFACES

William Herscovitch, Melbourne, Victoria, Australia

Application December 24, 1953, Serial No. 400,158

5 Claims. (Cl. 254—38)

This invention relates to apparatus for moving wheeled vehicles along the surfaces on which they are supported, and more particularly, but not exclusively, to apparatus capable of moving a railway vehicle, for example a wagon, along a track when no locomotive is available.

The main object of the invention is to provide such apparatus which will not slip on the supporting surface, so that it may safely be used on for example, a gradient, and will follow the vehicle as it moves.

Another object of the invention is to provide a power operated unit for moving a railway vehicle, which requires a minimum of control by its operator.

These and other objects of the invention, and the advantages to be obtained therefrom will become fully apparent from the following description of a preferred embodiment of the invention which is to be read in conjunction with the accompanying drawings in which:

Figure 1 is a side elevation of a power operated unit for moving a railway vehicle along a track;

Figure 2 is a plan view of the unit;

Figure 2a is an enlarged diagrammatic elevational view of the forward part of the unit;

Figure 3 is an enlarged diagrammatic scrap sectional view of the crank mechanism of the unit, taken on the line 3—3 in Figure 2 and seen in the direction indicated by the arrows;

Figure 4 is an enlarged diagrammatic scrap sectional view of a bearing forming part of the unit, taken on the line 4—4 in Figure 2 and seen in the direction indicated by the arrows, and Figure 5 is a further enlarged diagrammatic scrap sectional view of the bearing, taken on the line 5—5 in Figure 4, and seen in the direction indicated by the arrows.

Referring to the drawings, the unit comprises a frame designated generally by the reference numeral 1 which is formed of a pair of tubular steel side members 2, 3 extending from their forward (left-hand) end, rearwardly and upwardly in the form, when seen in plan, of a V, and terminating in two hand grip portions 4, 5. The side members 2, 3 of the frame 1 are braced by a pair of transverse members 6, 7, and the frame is supported on a roller 8 mounted in brackets 9 depending from the side members of the frame.

At the forward end of the frame 1 the side members 2, 3 are enlarged and formed each with a pair of opposed and inwardly directed semi-circular and concentric flanges 10, 11 and 12, 13 respectively which define a pair of opposed semi-circular grooves 14, 15. A hardened steel element 16 for gripping the rail R, which is of square section and is disposed with its sides at 45 degrees to the horizontal, is secured to the enlarged ends of the side members 2, 3 so as to extend between them with its lower edge 17 just below the plane containing the lower edges 18, 19 of the ends of the side members 2, 3.

A sub-frame designated generally by the reference numeral 20 and comprising a pair of similar, spaced and parallel side plates 21, 22 secured together, is mounted for angular movement relatively to the frame 1 by means of arcuate bearing members 23, 24 which engage in the semi-circular grooves 14 and 15. An element 25 having a gentle concave upper surface 26 to engage a wheel W of the railway vehicle to be moved is pivoted to the forward end of the sub-frame 20 by means of a pin 27 extending between the side plates 21, 22 of the sub-frame. A lever 28 is pivoted to the rear end of the sub-frame 20 by means of a pin 29 extending between the side plates 21, 22, and working in a slot 30 in the lever 28 so that relative linear movement between the sub-frame 20 and the lever can take place. A pair of opposed holes 29a is bored in the side plates 21, 22 of the sub-frame 20, and a further slot 30a is formed in the lever 28, to provide an alternative position for the pin 29. The forward end of the lever is connected by means of a pin 31 with the rear end of the wheel engaging element 25.

The rear portion of the lever 28 is strengthened and formed with an integral extension 32 providing a parallel-sided slot 33 for a slider 34 rotatably mounted on a crank pin 35 carried by a pair of equal crank arms 36, 37 which rotate on opposite sides of the lever 28. The crank arms 36, 37 are mounted on stub-shafts 40, 41 respectively which are carried in bearings 42, 43 secured to the transverse frame member 6 which is hooped to clear the crank arms 36, 37 and the lever 28 and its extension 32.

A small petrol motor 45 of, for example, 6 horsepower is mounted on a platform 46 secured between the side frame members 2, 3 over the roller 8. A clutch (not shown) controlled by a hand lever 48 attached to the transverse frame member 7 in a convenient position near the hand grip 4, connects the drive from the engine 45 to a pulley wheel 49. A belt 50 running over the pulley wheel 49 transmits the drive to a pulley wheel 51 mounted on the input shaft of a reduction gear 52 (providing, conveniently, a 10:1 ratio) secured on the platform 46, and this gear in turn transmits power for rotating the crank arm 36 through a sprocket 53 on its output shaft, a chain 54 and a further sprocket 55 secured on the stub shaft 40.

A powerful helical tension spring 60 is provided with a hook 61 at its forward end for attachment to any convenient part of the railway vehicle, and is connected by means of a wire 62 passing through a guide 63 secured to one side of the platform 46 to a hand winch 64 mounted on the transverse frame member 7 in a position conveniently near the hand grip 5.

A guide 70 is secured to the forward end of the frame member 3 to rub against the vehicle wheel W.

The operation of the unit is as follows: The unit is brought up to the railway vehicle to be moved with its wheel-engaging element 25 against the wheel W of the vehicle, the guide 70 on the inside of the wheel so as to be guided by the rim thereof, and the roller 8 supported on the rail R. The hook 61 is then attached to a convenient part of the vehicle, for example the wheel axle, and the hand which 64 actuated to tighten the wire. The clutch lever 48 may now be operated so that the engine rotates the crank arm 36 thereby causing a vertical reciprocatory movement of the lever 28. It will be asumed, for the purpose of explaining the operation of the unit, that the crank arm is in the position illustrated in Figure 1, and is rotating anti-clockwise as seen in that figure. Initial downward movement of the rear end of the lever 28 will cause an upward movement of the rear end of the wheel engaging element 25, and a reaction force will be exerted on the element 25 by the wheel W which will be transmitted through the sub-frame 20 and the bearing members 23, 24 thereof to the flanges 11 and 13 on the enlarged forward end of the side frame members 2, 3 and thence, through the grip element 16, to the rail. This pressure will cause the edge 17 of the hardened grip element 16 to dig into the relatively soft rail R and firmly anchor the forward end of the frame to the rail as long as the pressure is exerted. On further downward movement of the lever 28 the sub-frame will pivot slightly, its bearing members 23, 24 moving slightly rearwardly in the grooves 14, 15, and the wheel-engaging element 25 will make contact will the wheel W over the whole of its concave upper surface 26, and move upwardly to cause the wheel to move forward. It will be appreciated that this pivoting movement of the sub-frame takes place on an axis in the plane containing the lower edges 18, 19 of the frame side members 2, 3, which axis is parallel with and just above the lower edge 17 of the grip element 16 for most effective gripping engagement of the rail by such element.

When the lever 28 has finished its downward movement and begins to rise again, the wheel-engaging element 25 is lowered away from the wheel W and the downward pressure transmitted to the grip element 16 becomes negligible. The spring 60 will have been tensioned by the forward movement of the vehicle, and, as the frame 1 is no longer anchored to the rail, the tension in the spring will draw the entire unit forward so that when the lever 28 is again at the upper limit of its travel and ready to begin another downward, or working, movement, the wheel-engaging element 25 will again be in engagement with the wheel W.

The unit above described cannot slip on the rail on account of the wedge action of the wheel-engaging element and the positive grip of the element 16. The unit is therefore capable of use on wet, muddy or grass covered track, when other apparatus for moving vehicles, e. g. tractors, may be useless, and can safely be used on gradients without danger of the vehicles running back on to the operator.

The unit is very simple to operate, since once the winch 64 is set, the operator has only to operate the clutch control lever 48 as may be required, and to follow the unit in its forward movement.

I claim:

1. For moving a wheeled vehicle along a surface, apparatus comprising a shoelike element having a front face for engaging a wheel of the vehicle over an arc of said wheel and a rear part, a sub-frame having a forward end pivotally connected to the element at the forward end of its rear part to receive thrust transmitted by said element, a lever having its forward end pivotally connected with the element at the rear end of its rear part so as to apply thrust to the element when said lever end is moved upwardly and being pivotally connected intermediate the length of the lever to the rear end of the hub-frame, a frame, means at the forward end of the frame mounting the sub-frame for angular movement about an axis intermediate its ends and receiving thrust transmitted by the sub-frame, means on the frame to transmit thrust to the surface supporting the vehicle wheel and to grip said surface when transmitting said thrust, power means to effect reciprocal angular movement of the rear end of the lever whereby downward movement of said rear end lifts the wheel engaging element against the vehicle wheel and moves the wheel forwardly, and resilient means to be secured to the vehicle to cause the frame to follow up the vehicle when said vehicle moves forwardly and the thrust transmitting gripping means releases said surface, said frame having the general shape in plan of an acute-angled isosceles triangle, said sub-frame mounting means being located at the apex of the triangular frame, and the equal sides of said triangular frame terminating in a pair of handles adapted to be grasped manually for manipulation of the apparatus by the two hands of an operator.

2. For moving a wheeled vehicle along a surface, apparatus comprising a shoelike element having a front face for engaging a wheel of the vehicle over an arc of said wheel and a rear part, a sub-frame having a forward end pivotally connected to the element at the forward end of its rear part to receive thrust transmitted by said element, a lever having its forward end pivotally connected with the element at the rear end of its rear part so as to apply thrust to the element when said lever end is moved upwardly and being pivotally connected intermediate the length of the lever to the rear end of the sub-frame, a frame, means at the forward end of the frame mounting the sub-frame for angular movement about an axis intermediate its ends and receiving thrust transmitted by the sub-frame, means on the frame to transmit thrust to the surface supporting the vehicle wheel and to grip said surface when transmitting said thrust, crank means connected to the rear end of the lever to effect reciprocal angular movement thereof whereby downward movement of said rear end lifts the wheel engaging element against the vehicle wheel and moves the wheel forwardly, power means mounted on the frame to drive the crank means, means rigid with the frame at the rear thereof to be manually grasped by an operator for guiding the apparatus and resilient means to be secured to the vehicle to cause the frame to follow up the vehicle when said vehicle moves forwardly and the thrust transmitting gripping means releases said surface.

3. Apparatus as claimed in claim 2, comprising a roller mounted on the frame and rotatable about an axis fixed relatively thereto, said roller supporting the apparatus in normal use thereof in the region of its center of gravity.

4. Apparatus as claimed in claim 2, comprising a guide element fixed to the forward end of the frame to engage the vehicle wheel whereby to maintain said shoelike element in alignment therewith.

5. For moving a railway vehicle along a track, apparatus comprising a frame having in plan the general shape of an acute-angled isosceles triangle the equal sides of which terminate remote from its apex in handles, a sub-frame, means at the apex of the triangular frame rotatably mounting the sub-frame, a gripping member mounted on the frame adjacent said mounting means and having a sharp edge to dig into a rail of the track on transmission of downward thrust to said member through said mounting means, a shoelike element having a front face for engaging a wheel of the vehicle over an arc of said wheel and a rear part, said element being pivoted at the forward end of its rear part to the forward end of the sub-frame, a lever pivotally connected at its forward end to the rear end of the rear part of the wheel engaging element and pivotally connected intermediate its ends to the rear end of the sub-frame, crank means mounted on the frame and operatively connected to the lever adjacent its rear end to effect reciprocation thereof in a vertical plane, whereby downward movement of said rear end of the lever lifts the wheel-engaging element against the vehicle wheel to induce forward movement thereof, thrust from said wheel being transmitted to said gripping member to anchor it to the rail, a power source to rotate the crank means mounted on the frame between the apex thereof and said handles, a clutch between the power source and the crank means, a roller mounted on the frame below the power source to support the apparatus for transport and forward movement on the rail, and resilient means secured to the frame for attachment to the vehicle to cause the frame to follow up the vehicle when the frame moves forwardly and thrust is taken off said gripping member.

References Cited in the file of this patent

UNITED STATES PATENTS

| | | |
|---|---|---|
| 880,372 | Engbarth | Feb. 25, 1908 |
| 1,167,660 | Rolph | Jan. 11, 1916 |
| 1,272,398 | Dorsey | July 16, 1918 |
| 1,948,123 | Miller | Feb. 20, 1934 |
| 2,424,631 | Pierce | July 29, 1947 |
| 2,621,892 | Kilness | Dec. 16, 1952 |

FOREIGN PATENTS

| | | |
|---|---|---|
| 102,673 | Switzerland | Dec. 17, 1923 |